(12) United States Patent
Doll et al.

(10) Patent No.: US 12,397,413 B2
(45) Date of Patent: Aug. 26, 2025

(54) RUNNING RAIL FOR A ROBOT, ROBOT SYSTEM HAVING A RUNNING RAIL OF THIS TYPE, AND METHOD FOR PRODUCING A RUNNING RAIL OF THIS TYPE

(71) Applicant: IPR—Intelligente Peripherien für Roboter GmbH, Eppingen (DE)

(72) Inventors: Fredy Doll, Achern (DE); Markus Kamp, Kamp-Lintfort (DE)

(73) Assignee: IPR—INTELLIGENTE PERIPHERIEN FÜR ROBOTER GMBH, Eppingen (DE)

( * ) Notice: Subject to any disclaimer, the term of this patent is extended or adjusted under 35 U.S.C. 154(b) by 72 days.

(21) Appl. No.: 18/547,215

(22) PCT Filed: Feb. 22, 2021

(86) PCT No.: PCT/EP2021/054269
§ 371 (c)(1),
(2) Date: Aug. 21, 2023

(87) PCT Pub. No.: WO2022/174926
PCT Pub. Date: Aug. 25, 2022

(65) Prior Publication Data
US 2024/0123605 A1 Apr. 18, 2024

(51) Int. Cl.
*B25J 5/00* (2006.01)
*B25J 5/02* (2006.01)

(52) U.S. Cl.
CPC .................................... *B25J 5/02* (2013.01)

(58) Field of Classification Search
CPC ........................................................ B25J 5/02
See application file for complete search history.

(56) References Cited

U.S. PATENT DOCUMENTS

| 11,247,327 | B2 | 2/2022 | Doll et al. |
| 2019/0047138 | A1 | 2/2019 | Doll et al. |
| 2022/0281102 | A1* | 9/2022 | Chungbin ................ B25J 9/104 |

FOREIGN PATENT DOCUMENTS

| DE | 10035655 C1 | 9/2001 |
| EP | 0062096 B1 | 10/1982 |
| EP | 3378605 A1 | 9/2018 |
| EP | 3441523 A1 | 2/2019 |

OTHER PUBLICATIONS

International Search Report, with English translation, issued in corresponding International Application No. PCT/EP2021/054269, date of mailing Dec. 3, 2021 (5 pages).
Written Opinion of International Searching Authority, issued in corresponding International Application No. PCT/EP2021/054269, date of mailing Dec. 3, 2021 (5 pages).

* cited by examiner

*Primary Examiner* — Ian Jen
(74) *Attorney, Agent, or Firm* — FLYNN THIEL, P.C.

(57) ABSTRACT

A robot running axle for the displacement of a robot carriage has two parallel main supports, each of which is delimited on the outside by a metal profile in the form of a hollow profile or C-shaped profile, and each of which supports one guide rail. The main supports are connected to each other by a connection structure made of concrete, and the profiles of the main supports have an inner structure made of concrete. Alternatively, a polymer material or a metal foam can be used instead of concrete.

21 Claims, 6 Drawing Sheets

RUNNING RAIL FOR A ROBOT, ROBOT SYSTEM HAVING A RUNNING RAIL OF THIS TYPE, AND METHOD FOR PRODUCING A RUNNING RAIL OF THIS TYPE

FIELD OF APPLICATION AND PRIOR ART

The invention relates to a robot travel axis for the displacement of a robot carriage in translation, and to a robot system having such a robot travel axis and a robot carriage which is movable along the robot travel axis and by means of which a robot is movable in a travel direction. The invention relates additionally to a novel production method for producing a robot travel axis.

Robot travel axes of the type in question are known generally from the prior art. They are used for moving a conventional industrial robot along a defined and usually linear movement path. There is a need for such robot travel axes in many industrial fields of application, for example in manufacturing, if the robot is to be used at different locations, or in cases where the robot, as intended, is to be able to approach a workpiece store in order to grab parts there. Robot travel axes of the type in question are used in particular in the construction of passenger cars. They are here used at different processing positions in order to allow a robot carriage with the robot mounted thereon to be moved between the rear of the vehicle and the front of the vehicle. Robot travel axes of the type in question are usually several meters long, in particular approximately 3 m, 6 m or 12 m. However, longer travel axes of up to 100 m are also possible. In the case of long travel paths, this can also be achieved by means of a plurality of coupled robot travel axes.

Known robot travel axes are mostly in the form of wholly metallic travel axes, which mostly consist predominantly of components made of aluminum or steel. This results in a comparatively high price of the travel axes.

Configurations of robot travel axes in which concrete forms a substantial part of robot travel axes are already known from EP 3 378 605 A1 and EP 3 441 523 A1. The configurations described therein are therefore advantageous in terms of the material costs. The damping properties of the travel axes described in the documents are also very good. However, it has been found in practice that the production of such travel axes is very expensive, so that in practice the advantage of the material costs scarcely reduces the overall costs for production compared to conventional travel axes made of steel or aluminum.

PROBLEM AND SOLUTION

The problem underlying the invention is to provide a travel axis which meets high demands in terms of quality and can advantageously be produced in high piece numbers.

In order to solve this problem there is proposed a robot travel axis which has two main supports which run in parallel and are each delimited on the outside by a metallic profile in the form of a hollow profile or C-profile. If the profiles, which are preferably in the form of rectangular profiles, are configured as hollow profiles, they are closed at the periphery at least in portions, wherein they preferably have, in the manner described further hereinbelow, openings in the form of through-passages. If the rectangular profiles are configured as C-profiles, they have at least three walls which are preferably at right angles to one another and surround an inner space, while they are open on one side, either because there is no wall on the open side or because the fourth wall, although present, is interrupted by a profile interruption of the cross-section, so that a type of slot extends in the longitudinal direction of the profile.

These main supports, the outer form of which is defined by the mentioned profiles, each carry a guide rail, which is attached to the profiles in particular by means of a screw connection. Alternative joining techniques for attaching the guide rails to the profiles include welding, riveting or, depending on the application, also adhesive bonding. During operation, the robot carriage, which is displaceable in particular on casters in the main direction of extent of the travel axis, rests on the guide rails. The main supports are connected together by means of a connecting structure of concrete or of a polymer material, in particular a cured structural foam of polymer material, or of metal foam. This connecting structure is arranged between the main supports. In addition, the profiles themselves are also provided with an inner structure of concrete or of polymer material or metal foam.

An inner structure of concrete, of metal foam or of polymer material in the profiles and in the intermediate region between the main supports has been found to be very advantageous for reducing noise emissions during operation and also for achieving damping and thus for reducing vibrations. Wear on the main supports and the guide rails is thus reduced. Concrete additionally results in significantly increased stability, since it is able to absorb compressive forces acting in the transverse direction very well.

If concrete is used, the inner structures and the connecting structure preferably consist of simple construction concrete/cement concrete. It is also possible to provide the concrete with fiber inserts, preferably with meshes or mats. Such concrete is also referred to as textile concrete. In addition, it is considered advantageous if the concrete is provided with reinforcements, that is to say with a cast-in metal structure.

If polymer material is used, it is preferably a cured structural foam consisting thereof, for example polyurethane foam or polystyrene, or a hard foam.

If metal foam is used, it is a two-phase system comprising pores which are separated by solid metal walls. Such a metal foam is preferably produced by foaming melts with the aid of blowing agents or by means of gas injection.

The inner structure within the profiles results, as mentioned, in particular in advantageous damping properties, in particular in the case of rapid and jerky movements of the robot carriage or of the robot mounted thereon. In particular when concrete is used, the inner structure can further have the result, in practice, that comparatively thin-walled profiles can be used. In addition to the technical advantages, a travel rail according to the invention is economically advantageous. Owing to its simple producibility and low material costs, it is superior both to conventional travel rails made of metal and to the travel rails made of concrete and metal mentioned at the beginning.

In particular, the average wall thickness of the profiles is below 8 mm, preferably not more than 6 mm. Such small wall thicknesses can be employed when a robot travel axis according to the invention is used even if said travel axis carries a robot carriage with a robot mounted thereon having a total mass of more than 1000 kg or even more than 1500 kg. However, when wall thicknesses below 8 mm are used, the total mass of the robot carriage and the robot is preferably not more than 3000 kg, in the case of wall thicknesses below 6 mm preferably not more than 2500 kg.

In one embodiment according to the invention, the profiles can also have a comparatively small cross-section. Based on the above-mentioned preferred mass of the robot carriage with the robot, the width of the profiles in the transverse direction is preferably 180 mm or less. The inner structure of concrete, of polymer material or of metal foam does not have to fill the respective profiles completely. However, it is envisaged that at least that wall of the profiles that faces upward during operation is wholly in contact with the inner structure on the inside. This is not necessary, however, in respect of the opposite wall of the profile, which is on the bottom during operation, which can facilitate pouring of the concrete, the polymer material or the metal foam during production.

The connecting structure between the main supports serves especially to transfer compressive forces between the main supports. This is the case in particular for the use of concrete and of metal foam. However, a suitable polymer material can also contribute to force transmission. The connecting structure is in contact with both profiles of the main support.

Based on the main direction of extent of the travel axis, it is preferably provided that both the inner structure in the profiles and the connecting structure extend at least approximately (>80%) over the total length of the profiles. Preferably, an upper side of the connecting structure forms a continuous, upwardly facing concrete surface, metal foam surface or polymer surface from one end of the travel axis to the opposite other end.

A travel axis according to the invention usually has a length of 3 m, 6 m or 12 m. If longer lengths are required, a plurality of travel axes can be mounted one behind the other.

Preferably, the connecting structure and the inner structures form a cohesive concrete structure, metal foam structure or polymer material structure. In order to achieve this, it can be provided in particular that the profiles are in the form of hollow profiles and have on a longitudinal side the at least one opening already mentioned, through which the concrete structure, the metal foam structure or the polymer material structure projects. Preferably, there is a plurality of openings, wherein the clear cross-sectional area of each of the individual openings is preferably at least 15 cm². If the profiles are in the form of C-profiles, they each have, facing one another, a profile interruption which extends in the main direction of extent of the profiles and through which the concrete structure, the metal foam structure or the polymer material structure preferably projects. The width of the profile interruption is preferably at least 3 cm. In the case of a configuration of the profiles as C-profiles, it is considered advantageous if the wall of the profile that is configured with the profile interruption has on one side or on both sides wall portions which extend in the direction of the profile through-passage and in the case of two wall portions toward one another, and that these wall portions are enclosed on both sides by the mentioned concrete structure, the metal foam structure or the polymer material structure. A very firm connection between the concrete structure, the metal foam structure or the polymer material structure and the C-profiles is thus achieved.

The at least one opening per profile, preferably in the form of a through-passage, or the profile interruptions in the profiles are oriented in the direction toward the intermediate space between the profiles and thus connect the respective profile inner space with the intermediate space. This facilitates the introduction of the concrete, the metal foam or the polymer material, because all the mentioned spaces can be filled with concrete, metal foam or polymer material in a joint pouring operation and preferably starting from the intermediate space.

In addition, the resulting coherence of the structure, in particular of the concrete structure, comprising both the inner structures and the intermediate structure assists in the transmission of compressive forces between the outer walls of the respective profiles and thus improves both the damping and the strength of the travel axis.

However, the main supports are preferably not connected solely by means of the connecting structure.

Instead, it is preferably provided that the main supports are connected together by means of metallic connecting elements, wherein in particular preferably a plurality of these connecting elements connects the main supports together in a ladder-like manner. The connecting elements are preferably provided in the form of metallic hollow profiles or in the form of metal sheets, the directions of extent of which enclose an angle of 90° with the main direction of extent of the main supports. The ends of the connecting elements are fastened to the two profiles, in particular by a screw or welded connection.

The connecting elements are preferably surrounded completely by the concrete of the connecting structure and optionally also of the inner structure, apart from their respective ends. This has a positive impact on the stability of the travel axis. However, configurations are also conceivable in which the connecting elements are only partly in contact with the concrete structure or the polymer material structure with their outer side or are completely free of contact with the concrete structure or polymer material structure.

Where hollow profiles are used, it is preferably provided that the metallic connecting elements are fastened to an outer side of mutually facing walls of the profiles. The openings which are preferably provided in that wall and through which the concrete structure, the metal foam structure or the polymer material structure projects are preferably arranged, based on the main direction of extent, between two metallic connecting elements.

Where C-profiles are used, it is preferably provided that the metallic connecting elements are fastened to an inner side of walls of the C-profiles that face away from one another, so that they extend through an inner space of the profiles, through the profile interruption of the C-profile and also through the intermediate space.

Alternatively or in addition to the mentioned connecting elements, which in particular are preferably in contact with the inner structure and/or with the connecting structure, it can also be provided in a robot travel axis that the main supports are provided with at least one stand plate. The stand plate itself is preferably not in contact with the concrete structure, the metal foam structure or the polymer material structure and in particular is preferably also not attached until after the concrete, the metal foam or the polymer material has been poured in and cured.

There is preferably at least one stand plate which is provided on an underside of the profiles and is connected thereto by a screw or welded connection. The robot travel axis can have a single stand plate which extends at least approximately over the entire length of the travel axis. However, it is also possible to provide a plurality of stand plates which are fastened to both main supports in the manner of a sleeper or which are each fastened to only one of the main supports.

The at least one stand plate usually forms the base plate, which is placed directly on a factory floor and is anchored thereto. However, by means of additional intermediate elements such as adjustable feet or when used on a gantry, the stand plate can also be arranged spaced apart from a factory floor and connected indirectly to the factory floor. For fastening to a factory floor or to an intermediate element of the mentioned type, the stand plate preferably has holes through which, for example, screws for fixing the travel axis to the factory floor or to an intermediate element can be screwed.

In particular in addition to the at least one mentioned stand plate and the at least one mentioned connecting element, but also in the case of a configuration without a stand plate and without connecting elements, tension rods can be provided on the main supports, which tension rods extend into the inner structure or the connecting structure and thus permit a stronger connection between the main supports and the concrete, the metal foam or the polymer material. Such tension rods have a widened portion which, after casting or introduction into concrete, into the metal foam or into the polymass or the polymer foam, forms a positive securing means. In particular, the mentioned tension rods can be provided on the mutually facing walls of the profiles and extend into the intermediate space, where they become embedded in the connecting structure of concrete, metal foam or polymer material. However, it is also possible to provide tension rods on the inner side of the walls of the profile and thereby improve the connection between the profiles and the inner structure. The tension rods are preferably welded or screwed to the profiles.

An alternative possibility for producing or improving the connection between the concrete, the metal foam and the polymer material consists in providing a layer of an adhesion-promoting agent between an inner wall of the profiles and the inner structure and/or between an outer wall of the profiles or the metallic connecting element and the connecting structure. This is advantageous in particular when concrete is used, and facilitates the transmissibility of tensile forces between the concrete and the profiles.

Such an adhesion-promoting agent can in particular provide a rough surface structure on the profiles or on the connecting elements, with which the concrete or optionally also the polymer material enters into a positive connection. Preferably, the adhesion-promoting agent comprises an adhesive composition, which is liquid during the production, and fine-grained granules, preferably having a mean grain size of between 1 mm and 5 mm, which are fixed to the metallic surfaces by the adhesive composition. The adhesive composition, which solidifies after application to the surface and introduction of the granules, is preferably formed by a resin, in particular by epoxy resin. The granules are preferably formed by sharp-edged corundum granules.

It is particularly advantageous if at least a wall that faces upward during operation, to the upper side of which the guide rail is fastened, has the described adhesion-promoting agent facing inward. An intimate hold between this profile wall and the inner structure is very valuable for achieving the desired damping.

In addition to the robot travel axis as such, the invention relates also to a robot system having a travel axis of the described type. In addition, the robot system has a robot carriage which is displaceable along the travel axis and on which a robot is fixedly mounted or mountable.

The robot carriage has rollers by means of which it can be moved on the guide rails of the travel axis. It can be driven externally for this purpose, for example by means of a cable pull system. However, it is usual for the robot carriage itself to have a drive motor which travels with it.

In order to supply the robot carriage and the robot with electricity and optionally also with consumables such as paint, lines are preferably provided and form at least one line bundle which is arranged in a storage space between the guide rails.

The invention relates further to a method for producing a robot travel axis of the described type and, on the basis thereof, for producing a robot system of the described type.

In order to produce the robot travel axis, the two profiles are positioned in a parallel orientation and fixed in that orientation. Preferably, the profiles are already connected together at this point in time by means of welded-on or screwed-on connecting elements, which ensures that the profiles are arranged correctly relative to each other. The profiles are preferably fixed in an inverted orientation relative to the eventual use orientation, so that the eventual upper side faces downward.

Concrete, metal foam or polymer material is then introduced into the profiles and also into an intermediate space between the profiles, or the profiles and the intermediate spaces are foam-filled therewith. The cured concrete or the cured polymer material or the cured metal foam thus forms the described inner structure and the described connecting structure. As a result of the preferred inverse orientation, it is achieved that the inner structure, even if the profiles are not filled completely thereby, is in full surface contact at least with a wall that faces upward during operation.

The introduction or pouring in of the concrete, the metal foam or the polymer material to produce the inner structures and the connecting structure can take place separately from one another and optionally also in succession, so that the two inner spaces and the intermediate space are not filled in a single operation. However, it is advantageous if the concrete, the metal foam or the polymer material is introduced both into the inner spaces and into the intermediate space largely simultaneously, preferably in that the liquid concrete, the metal foam or the liquid polymer material is fed in at only one location and, from there, spreads out in the intermediate space and the inner spaces of the profiles.

This can be achieved in particular in that the various spaces are connected together by the described openings or profile interruptions.

Preferably, the adhesive force between the concrete, the metal foam or the polymer material and the surfaces of the profiles and/or the connecting elements is improved by applying an adhesion-promoting agent to the mentioned surfaces before the concrete, the metal foam or the polymer material is introduced, so that the surfaces are at least partly covered with the adhesion-promoting agent when the concrete, the metal foam or the polymer material is introduced. Which steps are expedient for improving the adhesion also depends especially on whether concrete, polymer material or metal foam forms the inner structure. In the case of polymer material, good results are achieved in particular by chemical activation of the surfaces and/or plasma treatment.

The adhesion-promoting agent is preferably applied in a two-step process, in which a liquid adhesive composition is first applied to the surfaces. In the case of the inner spaces of the profiles, this can take place in particular by insertion of a spray lance, which enters the profiles through the open ends of the profiles or laterally through the mentioned openings or profile interruptions and there introduces the adhesive composition by spraying or by delivering a mist, the adhesive composition then settling on the surfaces. It can be in particular an epoxy resin or another resin, optionally with further additives or constituents. At the same time or preferably in a later process step, fine-grained granules, preferably having a mean grain size of between 1 mm and 5 mm, are introduced. The grains of these granules meet the film of the adhesive composition, which fixes them. As soon as the adhesive composition has solidified sufficiently and the granules are therefore fixed sufficiently to the metallic surfaces, pouring of the concrete or of the polymer material or introduction of the metal foam can take place.

The combination of the two main supports and the structure formed by the pouring in of the concrete, the metal foam or the polymer material forms the main body of a travel axis. The actual guide rails for the robot carriage are subsequently attached thereto during production and are optionally also ground after they have been attached in order to ensure dimensional accuracy and parallelity. Furthermore, at least one stand plate, which is used to fix the guide rail to an underlying surface such as a factory floor, is attached to the underside.

In order to complete the robot system, one or more such travel axes are provided with a robot carriage, which carries the actual robot.

BRIEF DESCRIPTION OF THE DRAWINGS

Further advantages and aspects of the invention will become apparent from the claims and from the following description of preferred exemplary embodiments of the invention, which are explained hereinbelow with reference to the figures.

DETAILED DESCRIPTION OF THE EXEMPLARY EMBODIMENTS

Figure 1:
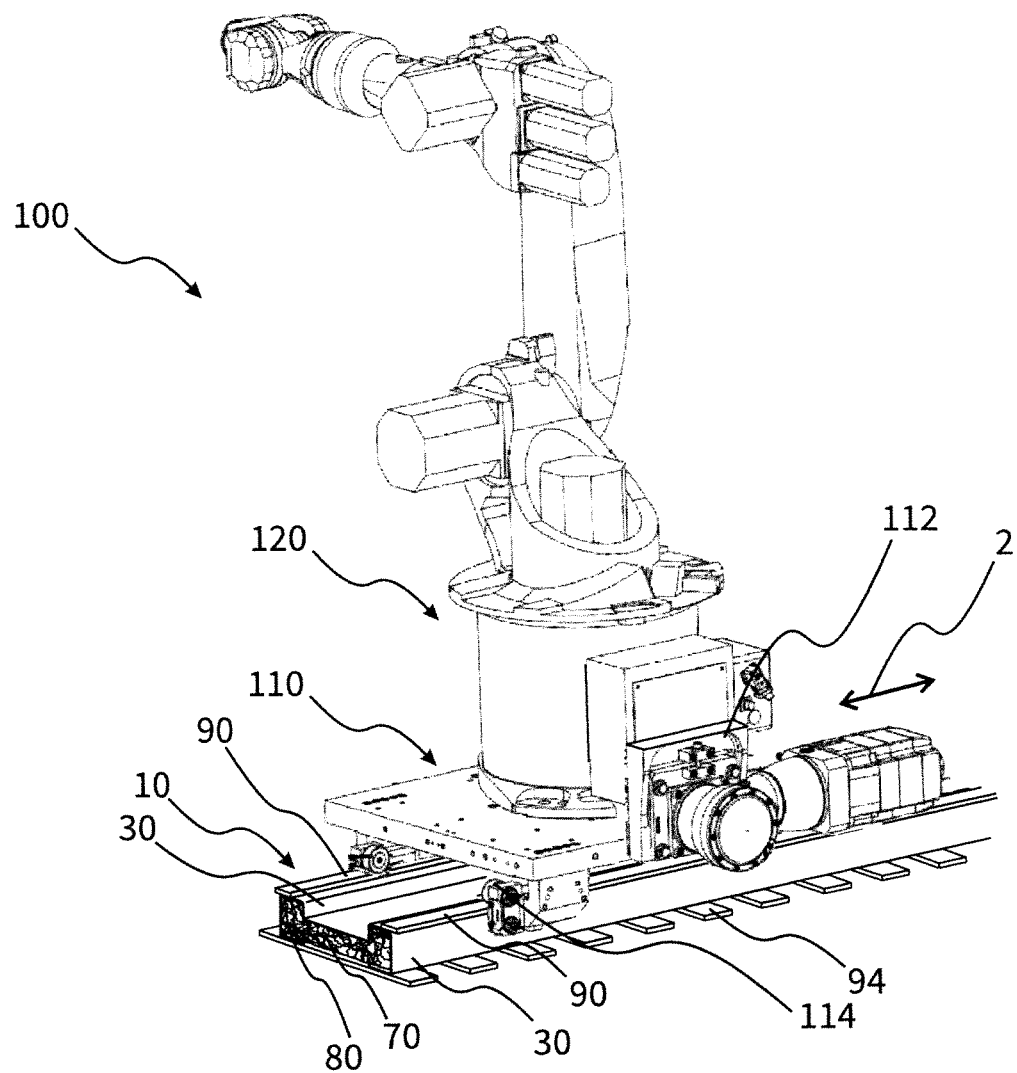
FIG. 1 shows a robot system of the described type having a travel axis, a robot carriage and an industrial robot fastened thereto.

FIG. 1 shows a complete robot system 100, which can be used, for example, in the industrial manufacture of motor vehicles. This robot system 100 has a robot 120 having a robot arm which is controllable by way of a plurality of joints. This robot 120 is mounted on a robot carriage 110.

The robot carriage 110 is movable in a travel direction 2 and has for that purpose a drive device 112, by means of which rollers 114 are driven. These rollers 114 rest on guide rails 90 of a robot travel axis 10.

Figure 2:
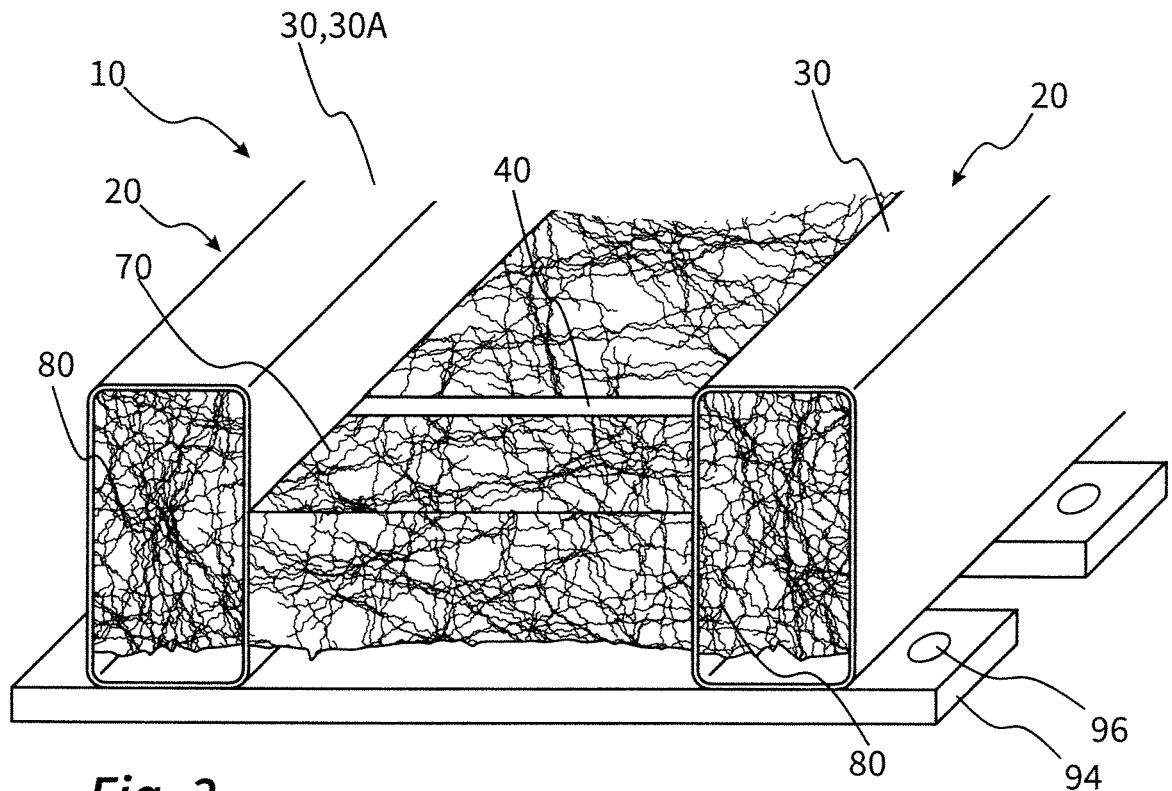
FIG. 2 shows the main body of the travel axis, consisting primarily of two hollow profiles and a concrete structure inside the profiles and between the profiles.

The robot travel axis 10, the main body of which is also shown in FIG. 2, has two main supports 20, to the upper side of which the guide rails 90 are fastened. The main supports 20 in turn each have a profile 30 which forms the outer contour of the main supports 20 and which in the case of the embodiment of FIGS. 2 to 5 is in the form of a hollow profile 30A. The hollow profiles 30A are connected together by means of metallic connecting elements in the form of transverse bars, in particular hollow profiles. They are further connected together by means of stand plates 94 which, oriented in the transverse direction, are fastened in the manner of sleepers to the underside of the hollow profiles 30A and provide fastening holes 96 for screwing the travel axis 10 to an underlying surface. The inner space of the hollow profiles 30A is formed for the most part by an inner structure 80 of concrete, in particular of conventional cement concrete. An intermediate space between the main supports 20 is partially filled with a connecting structure 70 of concrete which connects the main supports 20.

Within the context of the exemplary embodiments, the inner structure 80 and the connecting structure 70 are described as a concrete structure. However, it may likewise also be a polymer material structure or a structure of metal foam.

Figure 3:
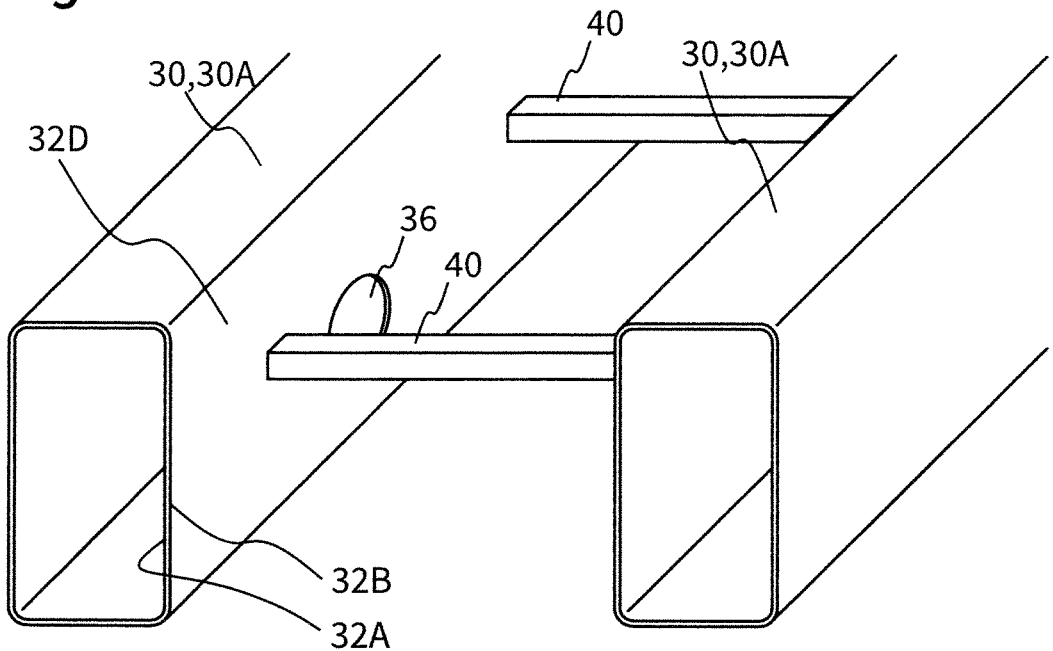
FIG. 3 shows a metal structure before the introduction of the concrete, which comprises the two hollow profiles and connecting elements connecting them.

FIG. 3 shows the metallic basic structure of the travel axis 10, consisting of the two hollow profiles 30A which have been mentioned and the connecting elements 40, which are connected to the hollow profiles 30A on mutually facing longitudinal sides 32D by means of welded connections. It will additionally seen in FIG. 3 that the hollow profiles 30A have openings 36 which each connect the inner space of the hollow profiles 30A to the intermediate space between the hollow profiles 30A.

Figure 4A:
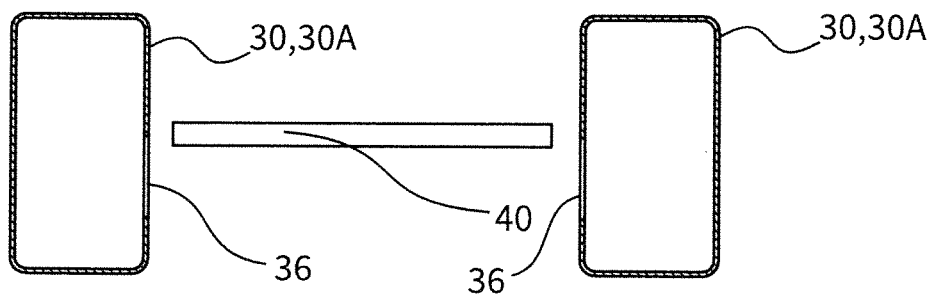
FIG. 4A to 4F illustrate by way of example the production of a travel axis of the type described above.
Figure 4B:
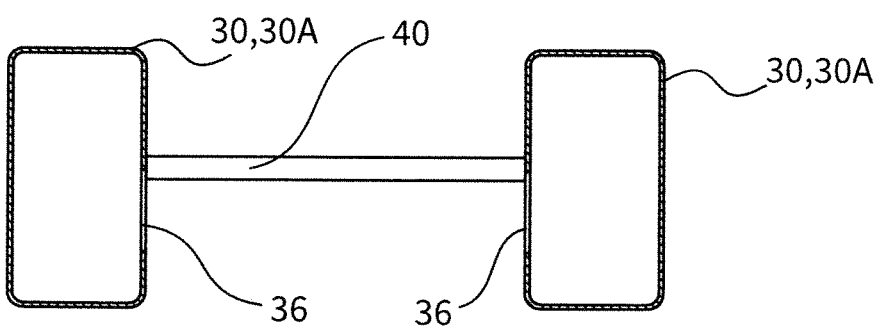
Figure 4C:
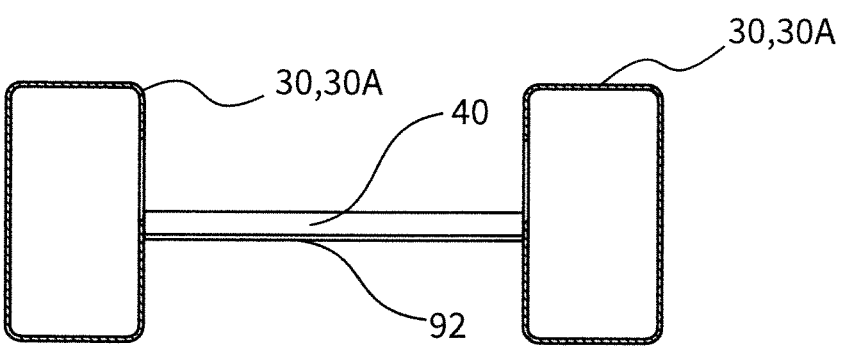

The production of the robot travel axis will be explained with reference to FIGS. 4A to 4F. Starting from the hollow profiles 30A, which are already provided with openings 36, and the connecting elements 40, a connected metal structure is first produced by welding the connecting elements 40 to the mutually facing outer walls 32B of the hollow profiles 30A. An approximately ladder-like metal structure, which is shown in FIG. 4B, is obtained.

This metal structure is then turned, so that an eventual upper side of the hollow profiles 30A faces downward. Furthermore, a stable or form-flexible covering is positioned beneath the connecting elements 40.

Figure 4D:
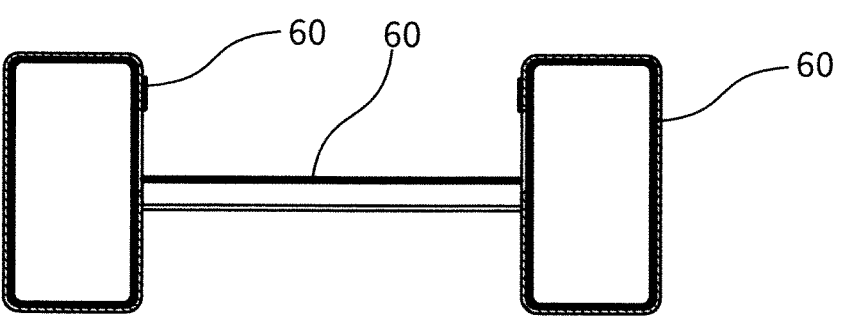

As is shown in FIG. 4D, an adhesion-promoting agent 60 is then applied to metallic surfaces of the basic structure over their whole area, which adhesion-promoting agent consists in particular of a liquid adhesive, for example epoxy resin, which is applied to the various surfaces of the metal structure by means of spray nozzles, for example, in particular at the end of insertion lances. Corundum granules, which are not shown in the drawings, are then introduced. When the granule grains of the corundum granules come into contact with the walls of the metal structure, they are held by the adhesive and thus form a rough surface structure once the adhesive has set.

Figure 4E:
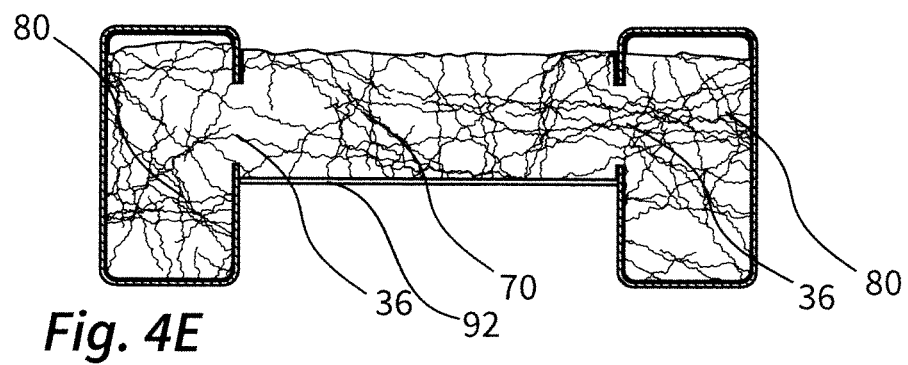

Then, in the manner illustrated in FIG. 4E, concrete is poured in and collects both in the inner spaces of the hollow profiles 30A and in the intermediate space between the hollow profiles, where it cures, so that it then forms the inner structures 80 and the connecting structure 70. Because of the openings 36, it is sufficient to add the liquid concrete starting from the intermediate region. The concrete then flows into the hollow profiles 30A through the openings 36. Owing to the inverted orientation at this point in time, it is ensured that the concrete reaches those walls of the hollow profiles 30A that are facing downward at this point in time and covers them at least largely completely. It is also ensured that the concrete forms a largely planar surface in the region of the covering 92. On the opposite side, that is to say at the top in the orientation of FIG. 4E, a rough surface forms, but in practice this does not constitute any disadvantage during operation.

Figure 4F:
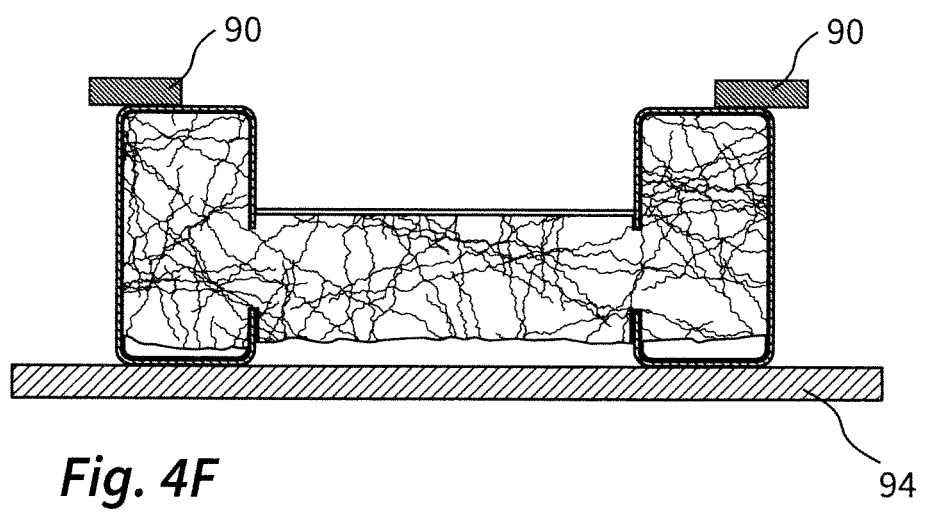

Finally, in the manner which is apparent from FIG. 4F, the at least one stand plate 94 is attached to the main supports 20. On the opposite side, the guide rails 90 are attached, in particular screwed on.

Figure 5:
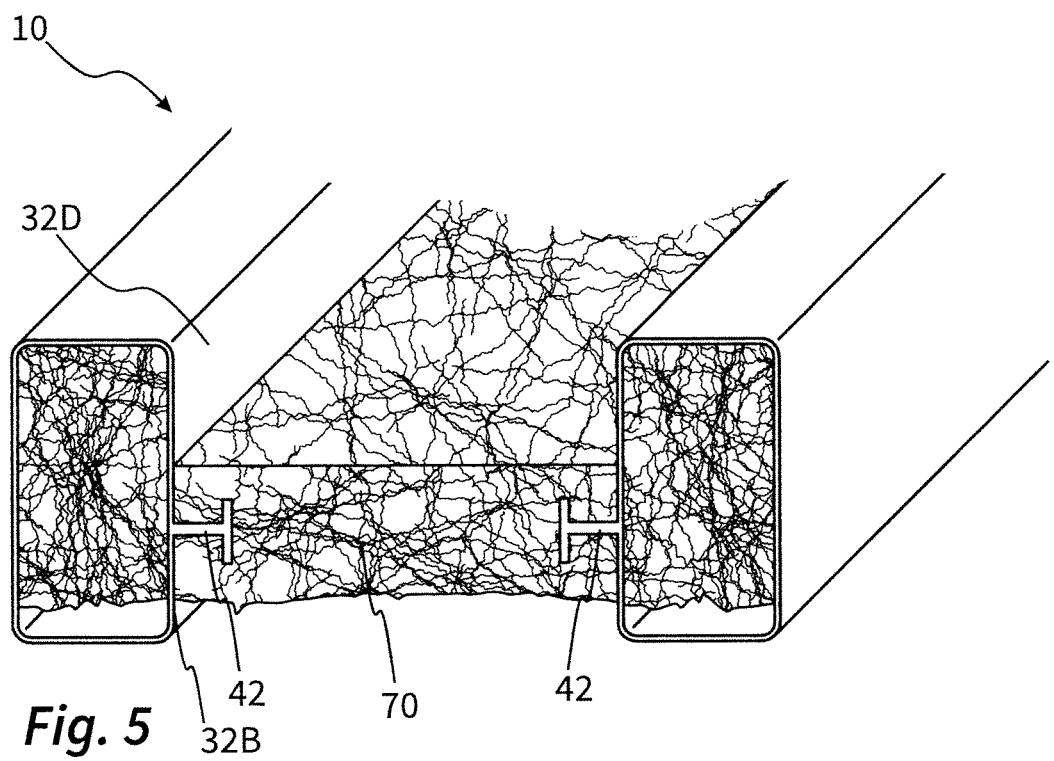
FIG. 5 shows a construction of a travel axis with tension rods.

FIG. 5 shows an alternative construction. In this construction, it is provided that tension rods 42 are provided on the outer wall 32B of the longitudinal sides 32D of the hollow profiles, which tension rods extend into the connecting structure 70 of concrete and thus also permit the transmission of tensile forces between the main supports 20 by way of the connecting structure 70. Although no further connecting elements 40 according to FIGS. 2 to 4F are shown in FIG. 5, such connecting elements can likewise be provided here, so that the tension rods 42 merely constitute an additional measure. However, configurations are also conceivable in which the connecting elements 40 are omitted, so that the main supports 20 are connected together only by means of the connecting structure 70 and optionally by means of the stand plates 94 (not shown in FIG. 5).

Figure 6A:
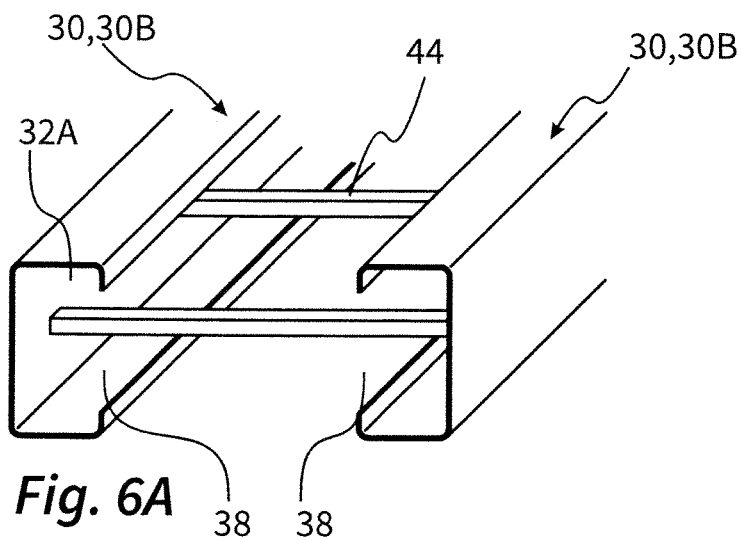
FIG. 6A to 6C show the production of a travel axis, in which, instead of the mentioned hollow profiles, C-profiles are used.
Figure 6B:
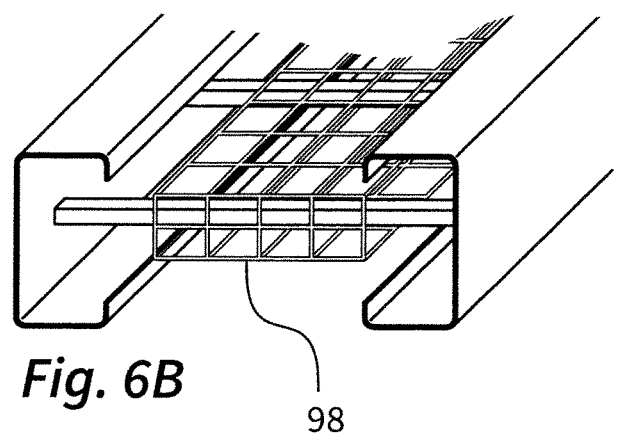
Figure 6C:
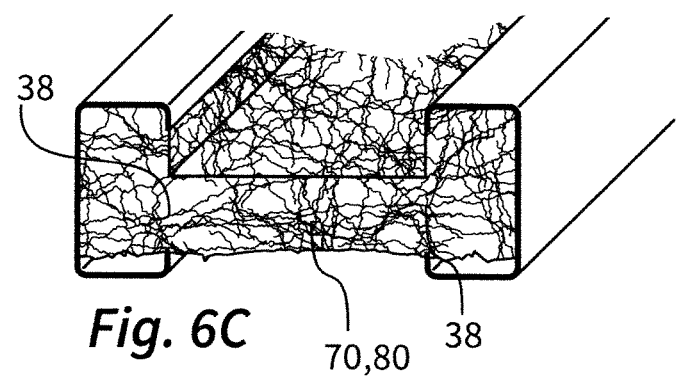

FIGS. 6A to 6C illustrate a further possible construction of the robot travel axis 10. The profiles 30 are here in the form not of hollow profiles 30A but of C-profiles 30B. The mutually facing walls of these C-profiles 30B have slot-like profile interruptions 38. The connecting elements 40, which in this case too are preferably formed by metal rods or metal hollow profiles, extend in this configuration into the profiles 30 and are fastened, in particular welded, to the inner wall 32A of the walls of the profiles 30 that face away from one another. In addition, the constitutive FIGS. 6A to 6C have a metallic reinforcing structure 98, which is put in place before the concrete is introduced, in order to provide the concrete with greater stability. In a departure from FIG. 6B, it can be provided that this reinforcing structure is wider, so that it extends into the inner region of the C-profiles 30B.

As can be seen from FIG. 6C, a concrete structure formed by inner structures within the C-profiles 30B and a connecting structure 70 is also provided here. Because of the profile interruptions 38, this concrete structure can be poured in a single operation.

The invention claimed is:

1. A robot travel axis for the displacement of a robot carriage in translation, comprising two main supports running in parallel and each delimited on an outside by a metallic profile in the form of a hollow profile or a C-profile, each main support carrying a guide rail, the main supports being connected together by a connecting structure of concrete, or of polymer material or of metal foam, the profiles of the main supports having an inner structure formed of concrete, or of polymer material, or of metal foam.

2. The robot travel axis as claimed in claim 1, wherein the profiles are hollow profiles and have at least one opening on a longitudinal side, and the connecting structure and the inner structures form a cohesive concrete structure or polymer material structure or metal foam structure projecting through the openings.

3. The robot travel axis as claimed in claim 1, wherein the profiles are C-profiles and have, facing one another, a profile interruption extending in a main direction of extent of the profiles, and the connecting structure and the inner structures form a cohesive concrete structure or polymer material structure or metal foam structure projecting through the profile interruption.

4. The robot travel axis as claimed in claim 1, wherein the main supports are connected together by at least one metallic connecting element.

5. The robot travel axis as claimed in claim 1, wherein the main supports are provided with at least one stand plate.

6. The robot travel axis as claimed in claim 1, wherein tension rods are provided on the main supports, the tension rods extending into the connecting structure of concrete or of polymer material or of metal foam.

7. The robot travel axis as claimed in claim 1, further including one or more of:
   a layer of an adhesion-promoting agent provided between an inner wall of the profiles and the inner structure of concrete or of polymer material or of metal foam; and/or
   a layer of an adhesion-promoting agent provided between an outer wall of the profiles or a metallic connecting element, interconnecting the main supports, and the connecting structure of concrete or of polymer material or of metal foam.

8. The robot travel axis as claimed in claim 1, further including one or more of:
   the profiles have a width transverse to a travel direction of less than 180 mm; and/or
   the profiles have a wall thickness of not more than 6 mm; and/or
   the inner structure of concrete or polymer material or metal foam does not completely fill a free cross-section of one of the profiles, wherein the inner structure is in contact in an adhering manner at least with an upper profile surface of the cross-section; and/or
   the connecting structure is provided on an upper side with a covering comprising a flexible sheet element.

9. A robot system comprising:
   a robot travel axis including two main supports running parallel and each delimited on an outside by a metallic profile in the form of a hollow profile of C-profile, each main support carrying a guide rail, the main supports being connected together by a connecting structure of concrete, or of polymer material or of metal foam, the profiles of the main supports having an inner structure formed of concrete, or of a polymer material, or of metal foam; and
   a robot carriage movable along the robot travel axis for moving a robot in a travel direction.

10. A method for producing a robot travel axis as claimed in claim 1, comprising the steps of:
    positioning the profiles in a parallel orientation;
    pouring concrete or a polymer material into the profiles and also into an intermediate space between the profiles, or filling the profiles and the intermediate space between the profiles with a metal foam; and
    curing the concrete or the polymer material or the metal foam and forming the inner structure and the connecting structure.

11. The method as claimed in claim 10, further including:
    providing openings on longitudinal sides of the profiles in the form of hollow profiles; and
    when the concrete or the polymer material or the metal foam is introduced, the concrete or the polymer material passes through the openings into the hollow profiles or into the intermediate space.

12. The method as claimed in claim 10, further including:
    providing profile interruptions on longitudinal sides of the profiles in the form of C-profiles; and
    when the concrete or the polymer material or the metal foam is introduced, the concrete or the polymer material or the metal foam passes through the profile interruptions into the C-profiles or into the intermediate space.

13. The method as claimed in claim 10, further including covering inner walls of the profiles at least partially with an adhesion-promoting agent before the concrete or the polymer material or the metal foam is introduced.

14. The method as claimed in claim 10, further including covering outer walls of the profiles that face the intermediate space and/or covering at least one metallic connecting element at least partially with an adhesion-promoting agent before the concrete or the polymer material or the metal foam is introduced.

15. The method as claimed in claim 10, further including turning the profiles so that their upper side is oriented downward
   when the concrete or the polymer material or the metal foam is introduced into the profiles.

16. The robot travel axis as claimed in claim 1, wherein the inner structure is formed of a polymer material comprising a polymer structural foam.

17. The robot travel axis as claimed in claim 4, further including one or more of the following:
   the at least one metallic connecting element is surrounded by the connecting structure; and/or
   the at least one metallic connecting element is fastened to an outer side of mutually facing walls of the profiles; and/or
   the at least one metallic connecting element is fastened to an inner side of walls of the profiles that face away from one another, and extends through an opening or a profile interruption of each of the profiles.

18. The robot travel axis as claimed in claim 5, wherein the at least one stand plate connects the main supports together by a welded or screw connection.

19. The robot travel axis of claim 7, wherein the layer of adhesion-promoting agent comprises a liquid adhesive composition and fine-grained granules including epoxy resin and corundum granules.

20. The method as claimed in claim 13, further including one or more of the following:
   the adhesion-promoting agent comprises a liquid adhesive composition; and/or
   the adhesion-promoting agent comprises fine-grained granules; and/or
   the method further includes introducing the adhesion-promoting agent at least in part with a lance introduced into the hollow profile through at least one opening in the hollow profile.

21. The method as claimed in claim 14, further including one or more of the following:
   the adhesion-promoting agent comprises a liquid adhesive composition; and/or
   the adhesion-promoting agent comprises fine-grained granules.

* * * * *